United States Patent [19]

De Palma et al.

[11] 3,893,748

[45] July 8, 1975

[54] LOW SCINTILLATION, MULTI-COMPONENT PROJECTION SCREEN

[75] Inventors: James J. De Palma; Alan P. Van Kerkhove, both of Rochester, N.Y.

[73] Assignee: Eastman Kodak Company, Rochester, N.Y.

[22] Filed: Oct. 15, 1974

[21] Appl. No.: 514,965

Related U.S. Application Data

[63] Continuation-in-part of Ser. No. 420,755, Nov. 30, 1973.

[52] U.S. Cl. .............................. 350/128; 350/167
[51] Int. Cl. .................................... G03b 21/60
[58] Field of Search ........................... 350/128, 167

[56] References Cited
UNITED STATES PATENTS

| 3,180,214 | 4/1965 | Fox | 350/128 |
| 3,191,495 | 6/1965 | Miller | 350/128 |
| 3,580,661 | 5/1971 | Copper, Jr. | 350/128 |
| 3,791,712 | 2/1974 | Miyagi | 350/128 |
| 3,832,032 | 8/1974 | Shimada | 350/128 |

*Primary Examiner*—Richard A. Wintercorn
*Attorney, Agent, or Firm*—John D. Husser

[57] ABSTRACT

An improved projection screen which substantially reduces scintillation includes a first transparent element having an initial light refracting surface of closely spaced micro-optical elements that redirect a substantial portion of the light rays simultaneously entering a retina-resolvable area of the screen along different non-parallel paths of travel within the screen. Transparent spacing means are located adjacent the screen element containing the initial refracting surface and provide for intra-screen amplification of the initially created differences in the paths of ray travel to an extent that the intra-screen paths of travel of such rays differ by more than the coherence length of the image projecting light source.

14 Claims, 13 Drawing Figures

3,893,748

LOW SCINTILLATION, MULTI-COMPONENT PROJECTION SCREEN

This Application is a continuation-in-part of U.S. application Ser. No. 420,755 filed Nov. 30, 1973 in the names of James J. DePalma and Alan P. VanKerkhove entitled "Multi-Component Projection Screen."

CROSS REFERENCE TO RELATED APPLICATIONS

Reference is made herein to U.S. application Ser. No. 207,334 filed Dec. 13, 1973 and U.S. Ser. No. 207,383 filed Dec. 13, 1973.

BACKGROUND OF INVENTION

This invention relates to viewing screens of the reflective and transmissive type, i.e., front and rear projection screens, and in particular to improved structure of such screens which substantially obviates the objectionable phenomenon known as scintillation.

The scintillation phenomenon has been previously observed during the viewing of projected light images on reflective and transmissive screens, as very small bright spots which vary randomly in intensity and/or color from point to point. Such sparkling on the screen is annoying to the viewer and in lengthy viewings can cause eye strain and fatigue.

It is theorized that the screen scintillation phenomenon occurs when the light waves, passing to the eye from minute screen areas at the limit of the eye's resolution, are in large proportion spatially and temporally coherent. If that state exists, small intermittent bright and dark spots are perceived corresponding to the resultant magnitude of the coherent waves reaching the eye from such minute area.

Screens do not create such coherence; and therefore, with respect to both reflective and transmissive screens, the originating cause of the scintillation problem can be said to be the elements used to project images onto the screens. Specifically, the source of image projecting light, often a metal filament at high temperature, emits partially coherent light waves whose coherence can be greatly affected by the various apertures in the projection system which transmits the image light to the screen. Unless the screen in some manner destroys the coherence of a substantial portion of the light passing to the viewer's eye from each retina-resolvable screen area, the screen will be observed to scintillate.

Various prior art screens have substantially obviated the problem of scintillation by the provision of light scattering particles in, or light scattering surfaces on, the screen, such scattering tending to spread all incident light over wide areas and interject a large proportion of non-coherent light within each retina-resolvable area. However, these solutions are not of use with respect to high gain screens, i.e., screens which control the distribution of projected light within a small frontal viewing angle, since such wide angle scattering detracts substantially from the directionality of such screens.

Techniques for making, and applications for use of, high gain screens have increased in number markedly in recent years, e.g., in conjunction with microfilm readers and roomlight lecturing display devices; and as the availability and uses of high gain screens increased, the need for a solution to the undesirably high scintillation of such screens has become more pronounced.

SUMMARY OF INVENTION

It is therefore an object of the present invention to provide an improved projection viewing screen which substantially obviates the problem of scintillation.

A further object of the present invention is to provide an improved high gain viewing screen which exhibits substantially less scintillation than existing prior art devices of that type.

Yet another object of the present invention is to provide such a high gain, low scintillation viewing screen which also substantially eliminates "hot spots" i.e., nonuniform intensity within certain portions of the viewing area, yet is constructable in a flat configuration.

In general, these and other objects and advantages are accomplished in accordance with the present invention by the provision in a viewing screen of (1) a first light transmissive element that has a light ingress surface which includes a plurality of closely spaced micro-optical elements for refracting adjacent coherent light rays from their entering path along a plurality of different, nonparallel paths within said screen and (2) means which define a space for light ray travel, between such initial refraction and egress from the screen, that is sufficiently large to allow a substantial portion of the light rays simultaneously emerging from each retina-resolvable area of the screen, to have traveled paths within said screen that differ in length by more than the coherence length of the image light incident on the screen. In accordance with particularly advantageous embodiments of the invention, the differences in paths of travel within the screen, of adjacent entering light rays, are increased by providing at least two screen elements separated by a transition media of low refractive index, such as, e.g., air. In accordance with a more specific advantageous embodiment, a Fresnel light-redirecting element is incorporated to provide uniform light distribution with a flat screen configuration.

BRIEF DESCRIPTION OF THE DRAWINGS

In the detailed description of preferred embodiments of the invention, presented below, reference is made to the accompanying drawings in which like numerals denote like parts and wherein.

DESCRIPTION OF PREFERRED EMBODIMENTS

Figure 1:
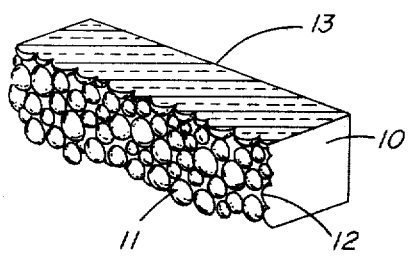
FIGS. 1-4 are fragmentary perspective views of transparent components, bearing micro-optical elements, that can be used in forming screen structures in accordance with the present invention.

Before proceeding with the detailed description of particular elements, components and configurations useful in accordance with the teachings of the present invention, some additional general explanation of the common features and principles of operation by which such elements, components and configurations effect the present invention is warranted.

As previously indicated the screens of the present invention all utilize an initial optical surface, comprised of a plurality of micro-optical elements, for initially refracting the projected light rays, simultaneously entering at points within retina-resolvable areas of the screen, along separate, non-parallel paths within the screen. The screens of the present invention are all further constructed to provide distances for travel, along those non-parallel paths, of sufficient length to allow amplification of the initially created differences in direction to an extent providing incoherence between a substantial portion of rays that simultaneously egress from each retina-resolvable screen area. More specifically, it is apparent that, if the light rays which simultaneously enter at proximate points of the screen travel non-parallel paths for a substantial distance, the rays will travel different distances within the screen and therefore egress from the screen at different points and at different times. When this difference in distances traveled within the screen is more than the coherence length of the emitting light source, the coherence between simultaneously entering rays will be lost, because a change in the nature of the light emitted from the source occurs during the time differential between the rays' respective dwell periods within the screen. It has been found that the screen structures of the present invention create the sufficient dwell period differentials between enough of the coherent rays that simultaneously enter retina-resolvable screen areas, to remarkably and unexpectedly reduce distracting scintillation. Thus the present invention provides a means to significantly reduce scintillation without severely reducing the high gain of a screen, as diffusing screens do. It should be emphasized that it is not necessary to eliminate the coherence of all rays which simultaneously exit from each given retina-resolvable area; objectionable scintillation is obviated by avoiding coherence between a substantial portion of the rays exiting from such an area at a given instant.

The initial refracting surface utilized in accordance with the present invention can be described as comprising a plurality of closely spaced micro-optical elements, the term micro-optical elements for purposes of the specification and claims of this application meaning light refracting elements of good optical quality that are generally smaller than can be resolved by the human eye at useful viewing distances from the screen. Examples of initial refracting surfaces which can be utilized in the practice of the present invention are shown in FIGS. 1–4.

In FIG. 1, a transparent component 10 is provided with micro-optical elements, consisting of microspherical lenses 11, which are embossed on the surface 12. The lenses 11 can be of various diameters as well as of various powers and are closely spaced in a random distribution over the entire area of surface 12. Useful materials from which the component 10 can be made include clear plastic material such as styrene butadiene, polyvinyl chloride, polystyrene or cellulose acetate butyrate and useful sizes of lenses for microfilm viewer applications include from about 10 to 50 microns diameter. The angle of light distribution of screens incorporating the present invention is significantly affected by the radius of the curved segment of the micro-optical element on the light egress surface and for high gain microfilm viewing screens, spherical elements having an average radius of about 0.001 inch and an average diameter of 0.001 inch have been found particularly useful for controlling light distribution and obviating scintillation. As shown in FIG. 1 lenses 11 can be overlapped over the surface 12 of the component 10, and the other surface 13 of the component 10 is a plano surface. The thickness of component 10 will depend upon the composite screen configuration in which it is utilized, examples being set forth hereinbelow.

Figure 2:
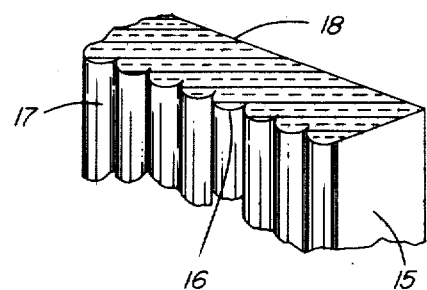

The transparent component 15, shown in FIG. 2, also can be made of a clear plastic material such as described above and has one surface 16 embossed with micro-optical elements comprising cylindrical lenses 17 which extend in one direction of the surface 16 with their respective axes generally parallel to one another. The other surface 18 is a plano surface and again the thickness of element 15 will depend on the composite screen configuration in which it is utilized. Useful sizes for the cylindrical lenses 17 have been found to include from about 0.001 to 0.010 inch radius with spacing of 0.002 to 0.01 inch.

Figure 3:
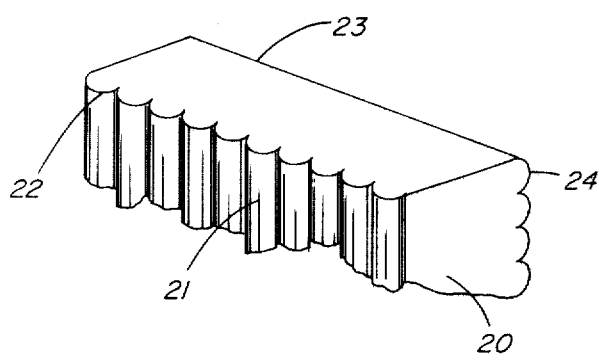

FIG. 3 discloses a transparent component 20 having cylindrical lens elements 21 embossed on one surface 22 thereof and extending in parallel relation to one another along the surface 22. The other surface 23 is also provided with cylindrical lens elements 24 which are embossed with their axes in parallel and at right angles to those of the elements 22 on the surface 21. This component is also made of a clear plastic material such as described above and useful sizes for these cylindrical lens elements also have been found to include from about 0.001 to 0.010 inch radius with a spacing of 0.002 to 0.01 inch.

Figure 4:
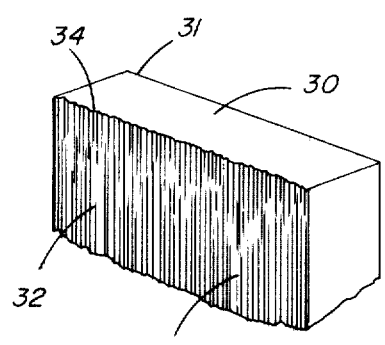

FIG. 4 shows another transparent component 30 having a plano surface 31 and a lenticulated surface 32. The micro-optical lenticulations 33 are of random size and extend generally parallel to one another throughout random lengths on the surface 34. This component is also formed of a clear plastic material, and the lenticulations 33 can be formed or embossed in the surface 34 in accordance with the teaching in U.S. Pat. applications, Ser. No. 207,334, filed Dec. 13, 1971, and Ser. No. 207,383 filed Dec. 13, 1971, as well as in U.S. Pat. Nos. 3,754,811 and 3,754,813.

Other micro-optical elements useful for refracting light in accordance with the teachings of the present invention, such as for example circular conical elements, will occur to those skilled in the art.

Reference is now made to FIGS. 5–10 in which the various transparent components described with respect to FIGS. 1–4 are utilized in various composite configurations, in accordance with the present invention, to form screens for displaying a projected light image to an observer with high gain but substantially reduced scintillation.

Figure 5:
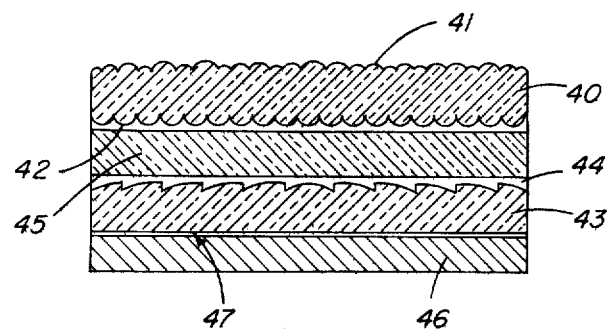
FIGS. 5-10 are enlarged sectional views through the thickness of various screen configurations constructed in accordance with the present invention.

In FIG. 5, a first transparent component 40 is provided on one surface with spherical micro-optical elements 41 of the type described with respect to FIG. 1, and on the other surface with cylindrical micro-optical elements 42 of the type described with respect to FIG. 2. A Fresnel lens 43 comprising another component is arranged such that the leans surface 44 faces the member 41. A sheet or layer of transparent material comprising still another component is inserted between component 40 and the Fresnel lens 43 and is designated by numeral 45. These components, as described thus far, can be assembled on a support 46 which, in the case of a reflection type screen would be an opaque member of a thin metallic material, a metal foil adhered to the plano surface 47 of the Fresnel lens 43, or a reflective coating which is applied directly to the surface 47. Alternatively the support 46 can carry a reflective metallic coating applied on the surface which faces the surface 47 of the Fresnel lens 43. Suitable reflective materials include aluminum, chromium, nickel, gold, silver, stainless steel, or other metals which will accept and maintain a highly reflective finish. These same metals can be vacuum deposited on the appropriate surfaces mentioned above and the layer 46 can be of a thin plastic material which is flexible and would therefore permit a roll-up type of screen to be made.

Figure 6:
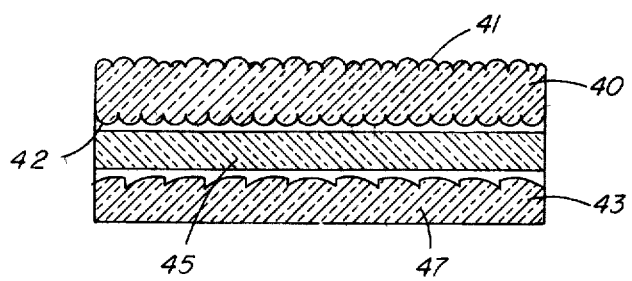

In FIG. 6, the same components as those shown in FIG. 5 have been used and assembled in the same relationship except that the support 46 has been omitted. In this particular embodiment, the reflective material would be applied or vacuum-deposited on the plano surface 47 of the Fresnel lens 43.

Figure 7:
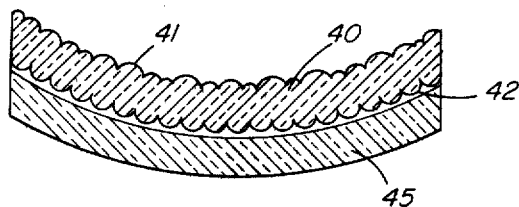

The embodiment shown in FIG. 7 is similar to that shown in FIG. 6 except that the Fresnel lens 43 has been removed. However, in order to obtain the same uniformity of screen brightness which would be otherwise imparted to the screen by the Fresnel lens, the component 40 and sheet or layer 45 have been curved. In this instance the reflective coating would be on surface of element 45 furthest spaced from element 41. The curvature of the components 40 and 45 can be in a direction about either the vertical axis or the horizontal axis of the screen, or the components can be formed so as to present a spherical front to the observer or viewing area.

Figure 8:
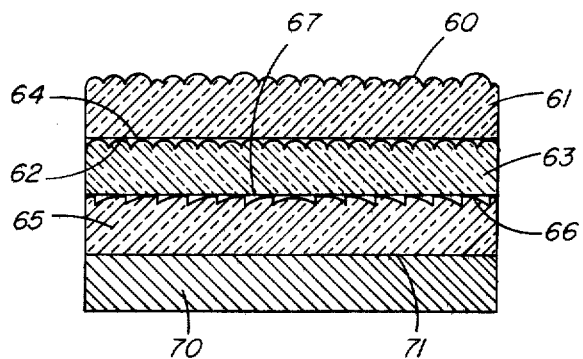
Figure 9:
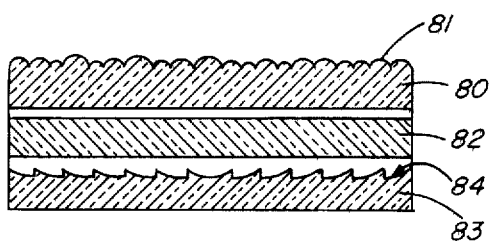

The embodiments of the invention shown in FIGS. 8 and 9 are similar to those shown in FIGS. 5-7, except that the micro-optical elements are provided on only one surface of an individual component of the screen composite. With reference to FIG. 8, spherical lenses of the type described with reference to FIG. 1, e.g., having an average radius of 0.001 inch and a diameter of about 0.001 inch, are formed in surface 60 of a transparent component or sheet 61 having a thickness e.g., of about 0.004 inch. Cylindrical elements 62 of the type described with reference to FIG. 2 for example having a radius of about 0.010 inch and pitch of 0.005 inch are formed in one surface of transparent component or sheet 63, which has a thickness e.g., of about 0.004 inch. The elements 62 abut or are spaced slightly from the plano surface 64 of the layer 61. Likewise, the transparent Fresnel lens 65 having a thickness e.g., of about 0.004 inch is positioned with its lens elements 66 spaced from or abutting the plano surface 67 of the layer 63. The support 70, which is opaque, can be a metallic member, a metal foil or a deposition of metal on the plano surface 71 of the Fresnel lens 65.

In FIG. 9 a simplified composite front projection screen structure incorporating the present invention is illustrated. The top component 80 is formed of transparent polystyrene and has a top surface 81 embossed with random spherical micro-optical elements of the type described with respect to FIG. 1, e.g., of radius of about 0.001 inch and diameter of about 0.001 inch. A desirable thickness for element 80 in accordance with this specific embodiment is about 0.004 ± 0.001 inch. Spacing component 82 also can be formed of transparent polystyrene and, as shown, has two planar surfaces. The spacing component 82 also has a thickness of about 0.004 ± 0.001 inch. The Fresnel component 83 of this particular embodiment is provided with a reflective aluminized top surface 84.

Figure 10:
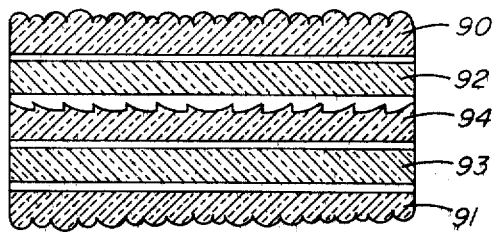

In the transmissive screen shown in FIG. 10 components 90 and 91 are the same as component 80 described in detail with respect to FIG. 9. Similarly, spacing components 92 and 93 of the FIG. 10 embodiment are the same as component 82 of FIG. 9. Fresnel component 94 is a converging transmission Fresnel lens, whereas the example of FIG. 9 embodies a converging reflection Fresnel lens. Component 94 may have Fresnel facets on either or both of its surfaces.

With respect to the front projection screen embodiments of the present invention described above with reference to FIGS. 5-9, it has been found that generally useful overall thicknesses of the optical elements above the reflecting layer are in the range of about 6 to 20 mils, with particularly desirable results being achieved with a thickness above the reflective layer in the range of about 10 to 15 mils. With the particular micro-optical element described with reference to FIGS. 5-9, it has been found that scintillation increases if the total thickness above the reflective coating is less than 10 mils. Similarly, it has been noted that when overall thicknesses are increased above 20 mils, contrast and sharpness of the reflected image are increasingly adversely affected. It will be understood that the relative thicknesses of individual elements forming the composite screen will not necessarily conform to the relative sizes shown in the drawings, and will be determined in many instances in accordance with constraints presented by manufacturing considerations.

With regard to the transmissive, rear projection screen, embodiment of the present invention described above with reference to FIG. 10, it will be understood that the overall thickness of the screen composite should be generally double that of the reflective screen to provide an equivalent space for light ray travel within the screen. Accordingly a useful overall screen thickness for use in conjunction with transmissive screens having micro-optical surfaces of the type described would be within the range of about 12 to 40 mils, with particularly desirable results being obtainable with an overall thickness in the range of about 20 to 30 mils.

In the embodiments shown and described with respect to FIGS. 5-10, the components can be arranged or attached to one another in various ways. One method which has been particularly useful is to charge the components electrostatically so that they adhere to each other, small air gaps thus being provided between the elements. Lamination techniques can also be used in a manner which maintains the small air gaps between the elements of the screen composite and the edge clamping likewise can be used to secure the components but provide air gaps therebetween. In another technique of fabrication, a sheet of plastic material can be overcoated with a layer of plastic material such as styrene butadiene or polyvinyl acetate and the random spheres or cylinders embossed in the overcoat layer.

As a further example of an assemblage of components which form a screen in accordance with the present invention, a polished sheet of aluminum was placed behind a sheet of the same size of a clear, plastic material 0.004 inch thick. A tesla coil was used to produce an electrostatic charge on the surface of the plastic material, thereby causing an attractive force between the plastic material and the aluminum sheet. A second and identical sheet of plastic material was secured in the same manner on top of the first sheet of plastic material. In order to complete the screen, a sheet of cellulose triacetate 0.005 inch thick and having a surface thereof embossed with circular spheres of approximately 0.001 inch radius, closely packed and randomly spaced, was placed over the second layer in the same manner, with the embossed surface forming the front surface of the screen.

When this multiple component assemblage was placed in a suitable projection system, it functioned as a front projection screen with a gain of over 35 and having little, if any, scintillation. The gain referred to is that described in "High-Brightness Projection Screens With High Ambient Light Rejection," J. S. Chandler and J. J. DePalma, SMPTE 77, No. 10, October 1968. When the uppermost sheet referred to hereinabove was replaced with a sheet of acetate embossed on one surface with loosely packed 0.0005 inch radius spheres in a random pattern, the scintillation decreased but the gain dropped to slightly below 20. It was found that the scintillation of this second example screen decreased when the second sheet of plastic material was replaced with four sheets, each of 0.001 inch thickness. The structures referred to above employed a static charge to hold the layers in place relative to one another.

In another structure, a thin layer of toluene-diluted silicone contact adhesive was coated on both sides of a first layer of clear plastic 0.004 inch thick and on the bottom plano surface of the second layer which had embossed thereon spheres of .0005 inch radius, loosely packed. The 0.004 inch thick sheet of plastic material with cement on both sides was placed in contact with an aluminum plate. Next, a 0.005 inch thick sheet of acetate embossed on one side with cylinders (0.002 inch radius, 0.00166 inch pitch) was placed with its plano surface on top of the other exposed surface of the first layer and the sheet of material with embossed spheres, having cement on its plano surface, was placed on the exposed embossed cylinder surface. The entire assemblage was run through pressure rollers and, when used as a projection screen, was found to produce a slight increase in observed scintillations over those assembled with an electrostatic charge.

The components just described were placed in the same sequence on an 18-inch cylindrically curved polished aluminum surface with no cement on any of the surfaces, the power of the cylindrical layer being normal to the direction of curvature. Electrostatic force was again employed to secure the elements. The uniformity of screen brightness in the viewing area was greatly improved and the scintillation was minimized. As mentioned hereinabove a reflectively coated Fresnel element can be utilized instead of the curved surfaced element to direct image light into a given audience space, thus avoiding hot spotting.

Figure 11:
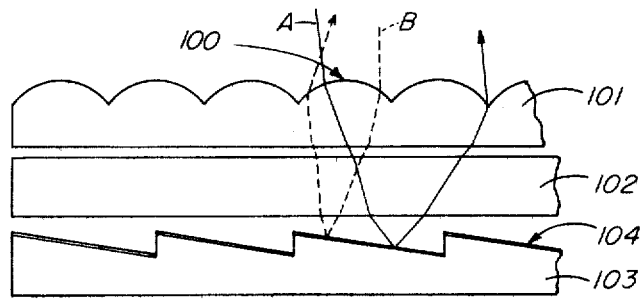
FIGS. 11, 12 and 13 are diagrammatic views showing the passage of a light beam through screen configurations such as shown in FIGS. 9 and 10.

FIG. 11 schematically illustrates the path of travel of two light rays A and B simultaneously impinging on a micro-optical element 100 of a reflective screen of the type described with respect to FIG. 9. It can be noted that element 100 initially refracts the rays along different non-parallel paths and that, within the space provided by elements 101 and 102 and the space between those elements and between Fresnel element 103, the paths traveled by the rays before egress are of significantly different length. It also can be seen that an increased amplification of the divergence of the ray paths occurs during transition through the air spaces between elements, as well as at the reflective surface 104.

Figure 12:
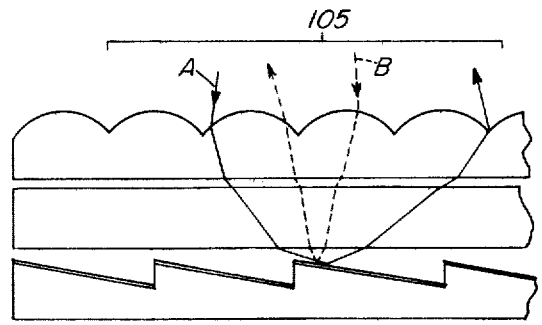

FIG. 12 similarly illustrates the path of light rays A and B simultaneously entering different micro-optical elements which are within a common retina-resolvable area 105 of a screen such as that described relative to FIG. 9. The retina-resolvable area 105 can be seen to have a diameter in the order of 4 or 5 micro-optical elements and it can be noted that each of the rays A and B travel paths within the screen of significantly different length, being affected by the screen structure in the same manner described above.

Figure 13:
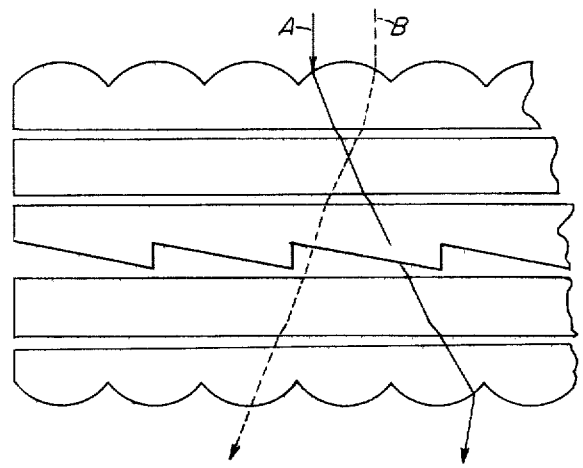

FIG. 13 provides a similar schematic illustration of the path of light rays simultaneously entering with a retina-resolvable area of a transmissive, rear projection screen such as described with respect to FIG. 10. Again it can be seen that the initially different refractions of the rays and space for travel provided by intermediate screen components cause a significantly different path length and dwell time within the screen for the respective rays.

Although light ray paths shown in schematic diagrams of FIG. 11, 12 and 13 are exaggerated somewhat to illustrate the effects of screens constructed in accordance with the present invention, it should be understood that the difference in dwell period required to avoid the coherent exit of simultaneously entering coherent rays is not of great magnitude. By way of illustration, a typical projection light source exhibits a coherence length in the order of a few microns and the normal path into and out of a typical screen in accordance with the present invention is in the order of 30 mils or 750 microns. It can be seen therefore that the difference of the respective light rays path length within the screen need not be of the magnitude indicated schematically in the Figures to exceed the coherence length of the source and avoid coherence of the rays at exit.

It will be apparent that the space required within the screen to avoid coherence will depend on the extent which entering light rays are diverted by the initial surface and on the extent which the diversion is subsequently amplified by transition refractions and reflection within the screen. In general it can be said that the increased space within the screen will be required as the radius to diameter ratio of the initial micro-optical elements increases. Also in general it can be said that an increase in the number of internal refractions will decrease the overall internal screen thickness required to avoid scintillation.

The present invention has been described in detail with reference to preferred embodiments thereof, but it will be understood that variations and modifications can be effected within the spirit and scope of the invention.

We claim:

1. An improved low scintillation screen for use with means for projecting image light, said screen having a light ingress and a light egress surface and further comprising:

a. incident light redirecting means, including a plurality of closely spaced micro-optical elements, for refracting a substantial portion of the projected light rays simultaneously entering each retina-resolvable screen area, respectively along non-parallel paths within the screen; and b. spacing means for providing a distance for intra-screen light ray travel between said redirecting means and said egress surface, said distance being of magnitude sufficient that the paths of intra-screen travel of such refracted light rays differ by more than the coherence length of the image light projected onto said screen.

2. The invention defined in claim 1 wherein said spacing means includes a reflecting surface located on the opposite side of said redirecting means from incident light and at least one transparent spacing element located between said redirecting means and said reflecting surface.

3. The invention defined in claim 1 wherein said egress surface is spaced from said ingress surface and further including at least one transparent spacing element located between said redirecting means and said egress surface.

4. An improved low scintillation screen for use with means for projecting image light, said screen having a light ingress and light egress surface and further comprising:
   a. incident light redirecting means, including a plurality of closely spaced micro-optical elements, for refracting a substantial portion of the projected light rays simultaneously entering each retina-resolvable screen area, respectively along non-parallel paths of travel within the screen; and
   b. means for amplifying the differences in paths of travel of such refracted light rays sufficiently that the difference in period of dwell within the screen of such rays exceeds the period in which the nature of image light changes.

5. An improved low scintillation viewing screen for use with means for projecting image light, said screen comprising:
   a. a first light transmissive element having an ingress surface containing a plurality of closely spaced micro-optical elements constructed to refract a substantial portion of projected light rays simultaneously entering any retina-resolvable area of the screen respectively along non-parallel paths within the screen;
   b. a second light transmissive element spaced closely adjacent the surface of said first element opposite said ingress surface in a manner forming a small transition space between said elements;
   c. means for reflecting light rays passing from said second element back toward said first element; and
   d. said first element and said second element being dimensioned in thickness such that a substantial portion of the light rays simultaneously emerging from each retina-resolvable area have traveled paths within said screen which differ in length by more than the coherence length of the image light projected onto said screen.

6. The invention defined in claim 5 wherein the distance between said ingress surface and said reflecting means is in the range of about 6 to 20 mils.

7. The invention defined in claim 5 wherein said micro-optical elements are constructed to direct egressing light within a small frontal viewing angle.

8. The invention defined in claim 5 wherein said reflecting means includes a Fresnel lens spaced closely adjacent the surface of said second element, opposite said first element.

9. The invention defined in claim 8 wherein the spaces between said first and second elements and between said second element and said Fresnel lens are occupied by a fluid medium.

10. The invention defined in claim 5 wherein the space between said first element and said second element is occupied by a fluid medium.

11. An improved low scintillation viewing screen for use with optical means for projecting light images thereon, said screen comprising:
   a. a first light transmissive element having a light ingress surface containing a plurality of micro-optical means for refracting light rays adjacently entering the screen respectively along different, non-parallel paths within the screen;
   b. a second light transmissive element spaced closely adjacent the surface of said first element opposite said ingress surface in a manner forming a small transition space between said elements;
   c. means for reflecting light rays passing from said second element back toward said first element; and
   d. said first element and said second element being dimensioned in thickness such that a substantial portion of the light rays simultaneously egressing each retina-resolvable area of the screen are each non-coherent.

12. The invention defined in claim 11 wherein said transition space is occupied by air.

13. The invention defined in claim 11 wherein said reflecting means includes a Fresnel lens spaced closely adjacent the surface of said second element, opposite said first element.

14. The invention defined in claim 13 wherein the space between said first and second element and the space between said second element and said Fresnel lens are occupied by air.

* * * * *